United States Patent [19]

Kurokami

[11] Patent Number: 5,230,006
[45] Date of Patent: Jul. 20, 1993

[54] ADAPTIVE EQUALIZER CAPABLE OF EFFECTIVELY REMOVING A REMAINING FADING IN AN EQUALIZED SIGNAL

[75] Inventor: Yuzo Kurokami, Tokyo, Japan

[73] Assignee: NEC Corporation, Tokyo, Japan

[21] Appl. No.: 716,473

[22] Filed: Jun. 17, 1991

[30] Foreign Application Priority Data

Jun. 15, 1990 [JP] Japan .................................. 2-155483

[51] Int. Cl.⁵ ........................ H03H 7/30; G06F 15/31
[52] U.S. Cl. .................................... 375/14; 364/724.2
[58] Field of Search ................ 375/11, 12, 13, 14, 375/96, 103, 113, 15, 16; 364/724.19, 724.2

[56] References Cited

U.S. PATENT DOCUMENTS

| | | | |
|---|---|---|---|
| 4,404,681 | 9/1983 | Hullwegen | 375/11 |
| 4,433,425 | 2/1984 | De Jaeger | 375/113 |
| 4,597,089 | 6/1989 | Motley et al. | 375/13 |
| 4,672,631 | 6/1987 | Suzuki et al. | 375/14 |
| 4,805,191 | 2/1989 | Burch et al. | 375/11 |

OTHER PUBLICATIONS

H. Yamamoto et al, "Automatic Equalizer in 1.544 Mb/s PCM-FDM System", Elec. Comm. Labs Tech. Journal, vol. 23, No. 6 (1974), pp. 1115-1149.
Japanese Unexamined Patent Publication No. 17661/1973 (Tokkai Syo 48-17661).

Primary Examiner—Curtis Kuntz
Assistant Examiner—Vijay Shankar
Attorney, Agent, or Firm—Sughrue, Mion, Zinn, Macpeak & Seas

[57] ABSTRACT

In an adaptive equalizer (40) connected to a demodulator (14) to equalize a demodulated signal into an equalized signal in accordance with main and first through N-th controllable tap gains, where N represents a positive integer which is not less than one, the main and the first through the N-th controllable tap gains are produced dependent upon the demodulated and the equalized signals and are controlled by main and first through N-th parameters, respectively. A supplying circuit (42) supplies main and first through N-th values as the main and the first through the N-th parameters to the adaptive equalizer when the demodulator is put in a synchronization state. The supplying circuit supplies main and first through N-th additional values as the main and the first through the N-th parameters to the adaptive equalizer when the demodulator is put out of the synchronization state.

5 Claims, 7 Drawing Sheets

ADAPTIVE EQUALIZER CAPABLE OF EFFECTIVELY REMOVING A REMAINING FADING IN AN EQUALIZED SIGNAL

BACKGROUND OF THE INVENTION

This invention relates to an adaptive equalizer which is used in combination with a demodulator.

A demodulator demodulates a received signal which may be subjected to fading while transmitted to the demodulator through a radio channel. The demodulated signal may be a baseband signal having a binary level or a multilevel. An adaptive equalizer is supplied with the demodulated signal and comprises an equalizer section for equalizing the demodulated signal into an equalized signal in accordance with a main controllable tap gain and first through N-th controllable tap gains, where N represents a positive integer which is not less than one.

A conventional adaptive equalizer further comprises a producing section for producing a main gain value and first through N-th gain values dependent upon the demodulated signal and the equalized signal and a processing section for processing the main gain value and the first through the N-th gain values into the main controllable tap gain and the first through N-th controllable tap gains in accordance with a main parameter and first through N-th parameters, respectively.

The main parameter and the first through the N-th parameters are representative of limiting values for limiting the main gain value and the first through the N-th gain values, respectively. The limiting values are used in rapidly controlling the main controllable tap gain and the first through the N-th controllable tap gains.

The conventional adaptive equalizer is disclosed in an article contributed by Hajime Yamamoto and Takaya Endo to the ELECTRICAL COMMUNICATION LABORATORIES TECHNICAL JOURNAL, VOL. 23 No. 6 of Nippon Telegraph and Telephone Public Corporation in 1974, pages 1115 to 1149, under the title of "Automatic Equalizer in 1.544 Mb/s PCM-FDM System". In the conventional adaptive equalizer, the main parameter is equal to one. The first through the N-th parameters are less than the main parameter.

However, the first through the N-th parameters are not varied in accordance with the demodulated signal in the conventional adaptive equalizer on controlling the main controllable tap gain and the first through the N-th controllable tap gains. As a result, the fading partially remains in the equalized signal. Therefore, it is difficult to effectively remove the remaining fading in the equalized signal.

SUMMARY OF THE INVENTION

It is an object of this invention to provide an adaptive equalizer capable of producing an equalized signal which includes substantially no remaining fading.

Other objects of this invention will become clear as the description proceeds.

On describing the gist of this invention, it is possible to understand that an adaptive equalizer is connected to a demodulator for demodulating a received signal into a demodulated signal. The adaptive equalizer comprises an equalizer section for equalizing the demodulated signal into an equalized signal in accordance with a main controllable tap gain and first through N-th controllable tap gains, where N represents a positive integer which is not less than one, a producing section for producing a main gain value and first through N-th gain values dependent upon the demodulated signal and the equalized signal, and a processing section for processing the main gain value and the first through the N-th gain values into the main controllable tap gain and the first through the N-th controllable tap gains in accordance with a main parameter and first through N-th parameters, respectively.

According to this invention, the above-understood adaptive equalizer further comprises (A) detecting means for detecting whether or not the demodulator is in a carrier synchronization state, the detecting means producing a first detecting signal when the demodulator is put into the carrier synchronization state, the detecting means producing a second detecting signal when the demodulator is not in the carrier synchronization state, (B) first supplying means responsive to any one of the first and the second detecting signals for supplying a main value as the main parameter to the processing section, (C) second supplying means responsive to the first detecting signal for supplying first through N-th values as the first through the N-th parameters to the processing section, respectively, the second supplying means being responsive to the second detecting signal for supplying first through N-th additional values as the first through the N-th parameters to the processing section, respectively.

DESCRIPTION OF THE PREFERRED EMBODIMENT

Figure 1:
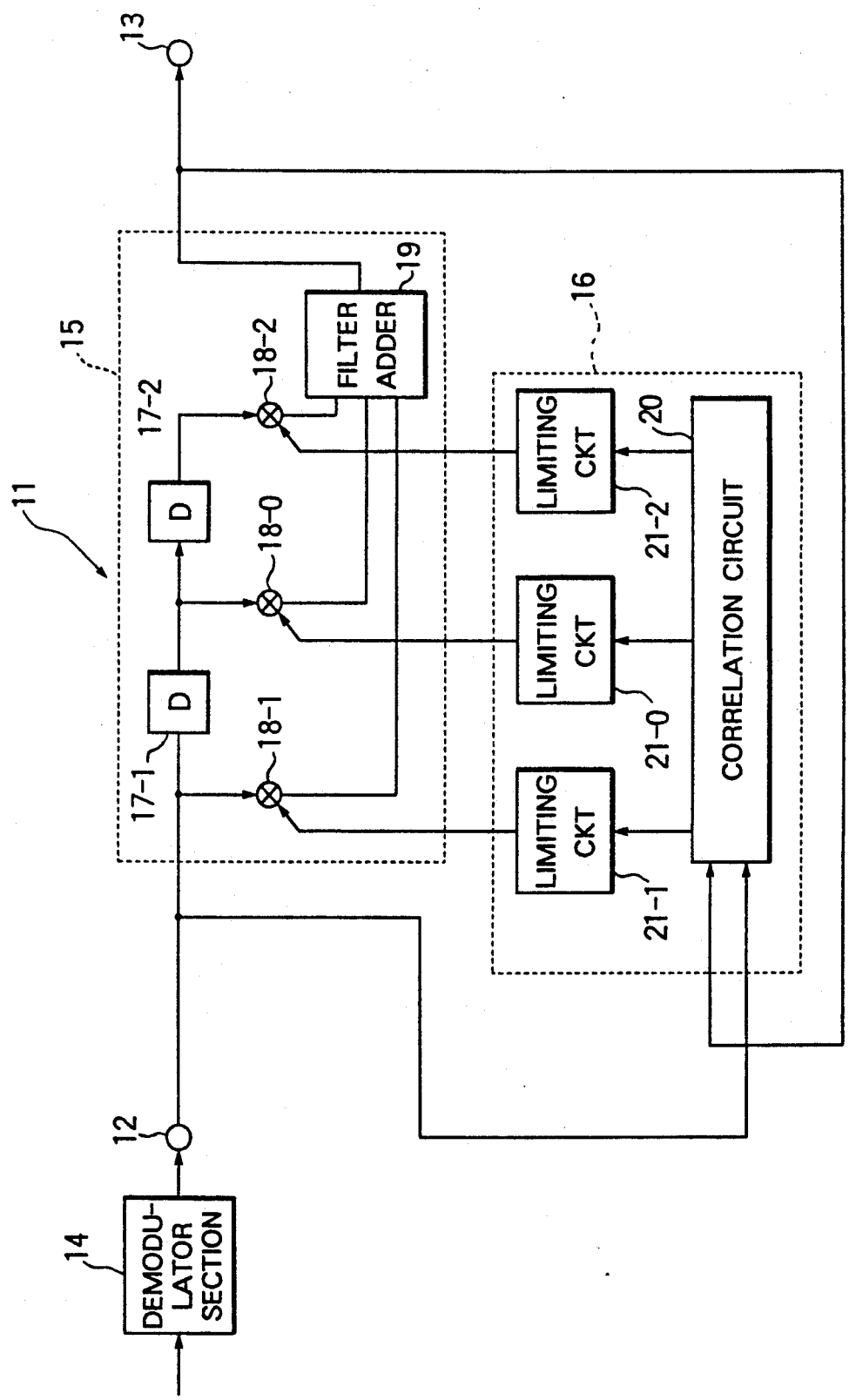
FIG. 1 is a block diagram of a conventional adaptive equalizer.

Referring to FIG. 1, description will first be made as regards a conventional adaptive equalizer 11 for a better understanding of this invention. The adaptive equalizer 11 has equalizer input and output terminals 12 and 13. The input terminal 12 is connected to a demodulator section 14. Through a radio channel, a transmitted signal is supplied to the demodulator section 14 as a received signal which is subjected to fading while transmitted to the demodulator section 14 through the radio channel. The transmitted signal may be, for example, a modulated signal into which a carrier signal is modulated by a digital signal. The digital signal is produced by sampling an analog signal at a sampling frequency f. The analog signal may be a speech signal.

The demodulator section 14 demodulates the received signal into a demodulated signal to supply the demodulated signal to the input terminal 12 of the adaptive equalizer 11. The demodulated signal may be a baseband signal having a binary level or a multilevel. The adaptive equalizer 11 is for equalizing the demodulated signal into an equalized signal for supplying the output terminal 13 with the equalized signal. In the adaptive equalizer 11, a transversal filter 15 is for filtering the demodulated signal into a filtered signal in accordance with a main controllable tap gain and first through N-th controllable tap gains, where N represents a positive integer which is not less than one. The filtered signal is equal to the equalized signal. In the illustrated example, the positive integer N is equal to two.

The main controllable tap gain and the first and second controllable tap gains are supplied from a tap gain control circuit 16 to the transversal filter 15.

The transversal filter 15 comprises first and second delay circuits (D) 17-1 and 17-2 and a main filter multiplier 18-0 and first and second filter multipliers 18-1 and 18-2. Each of the first and the second delay circuits 17-1 and 17-2 gives a delay of a predetermined time (1/f) to a signal supplied thereto. The demodulated signal is supplied to the first filter multiplier 18-1. The first and the second delay circuits 17-1 and 17-2 supply first and second delayed signals to the main filter multiplier 18-0 and second filter multiplier 18-2, respectively.

Supplied with the first controllable tap gain in the manner which will be described hereinafter, the first filter multiplier 18-1 multiplies the demodulated signal by the first controllable tap gain to supply a first multiplied signal to a filter adder 19. The main filter multiplier 18-0 and the second filter multiplier 18-2 multiply the first and the second delayed signals by the main controllable tap gain and the second controllable tap gain to supply main and second multiplied signals to the filter adder 19, respectively. The filter adder 19 calculates a total sum of the main, the first, and the second multiplied signals to supply the total sum as the equalized signal to the output terminal 13 and the tap gain control circuit 16.

The tap gain control circuit 16 comprises a correlation circuit 20 and main, first, and second limiting circuits 21-0, 21-1, and 21-2. The correlation circuit 20 receives the demodulated signal and the equalized signal.

Figure 2:
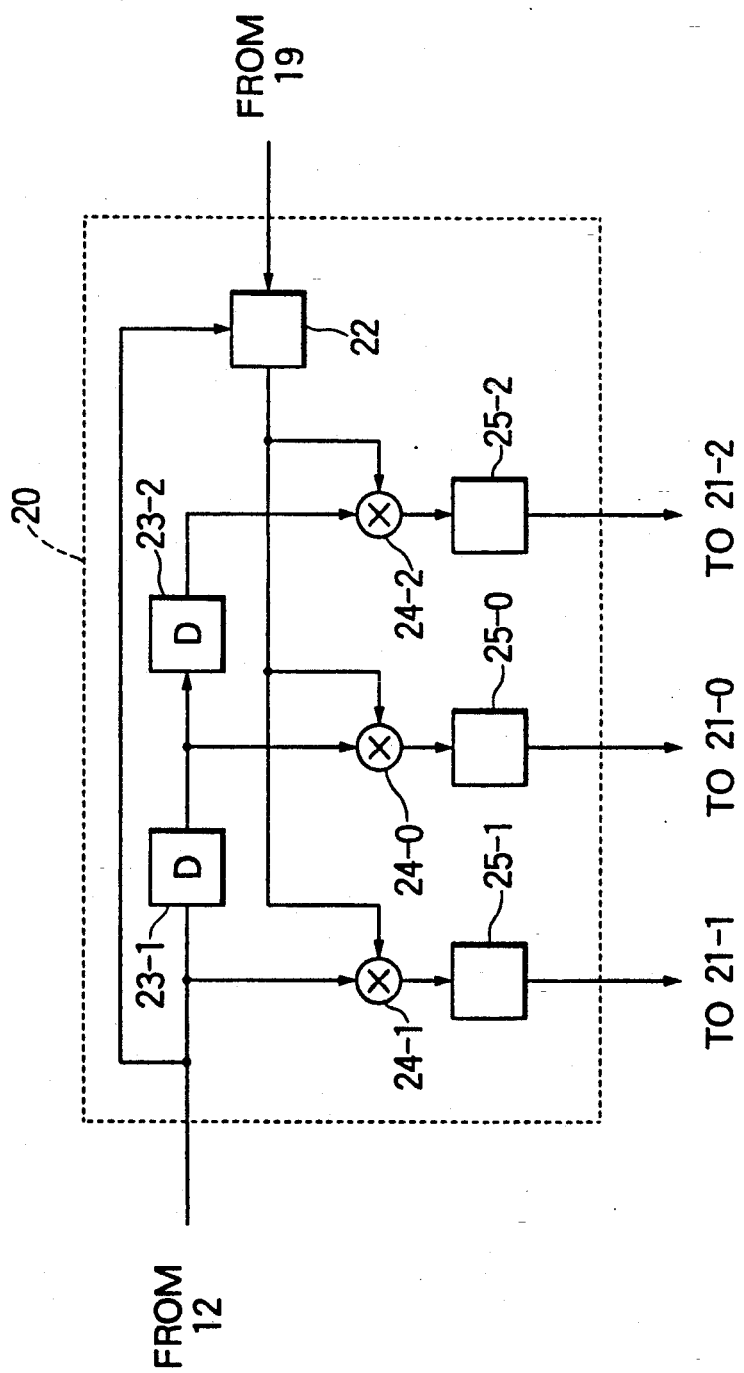
FIG. 2 is a block diagram of a correlation circuit used in the adaptive equalizer illustrated in FIG. 1.

Referring to FIG. 2, the correlation circuit 20 is for producing a main gain value and first and second gain values in accordance with the demodulated signal and the equalized signal. The correlation circuit 20 comprises a subtracter 22 and first and second correlation delay circuits 23-1 and 23-2. The subtracter 22 subtracts the equalized signal from the demodulated signal to deliver an error signal to main, first, and second correlation multipliers 24-0, 24-1, and 24-2, respectively. Each of the first and the second correlation delay circuits 23-1 and 23-2 gives a delay of the predetermined time (1/f) to a signal supplied thereto. The first and the second correlation delay circuits 23-1 and 23-2 supply first and second correlation delayed signals to the main and the second correlation multipliers 24-0 and 24-2, respectively. The main correlation multiplier 24-0 multiplies the first correlation delayed signal by the error signal to supply a main correlation multiplied signal to a main integrator 25-0. The first and the second correlation multipliers 24-1 and 24-2 multiply the demodulated signal and the second correlation delayed signal by the error signal, respectively. The first and the second correlation multipliers 24-1 and 24-2 supply first and second correlation multiplied signals to first and second integrators 25-1 and 25-2, respectively. The main, the first, and the second integrators 25-0, 25-1, and 25-2 successively integrate the main, the first, and the second correlation multiplied signals into main, first, and second integrated signals, respectively. The main, the first, and the second integrators 25-0, 25-1, and 25-2 supply the main, the first, and the second integrated signals to the main, the first, and the second limiting circuits 21-0, 21-1, and 21-2 as the main, the first, and the second gain values, respectively.

Figure 3:
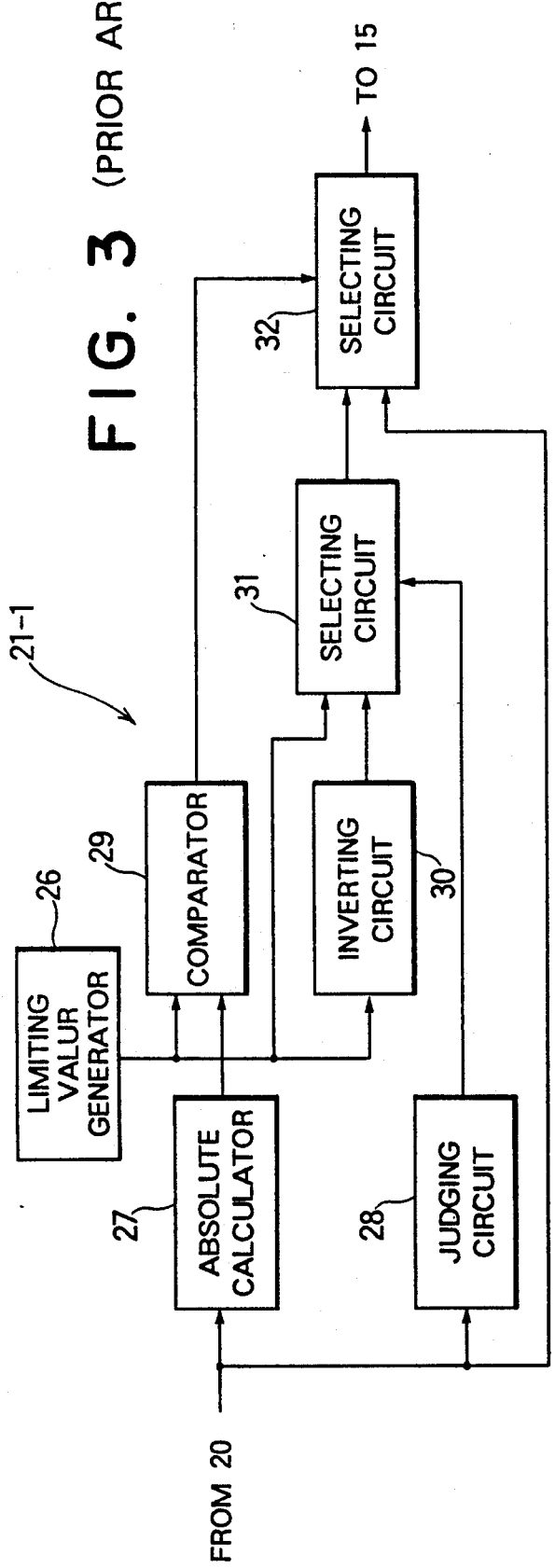
FIG. 3 is a block diagram of a limiting circuit used in the adaptive equalizer illustrated in FIG. 1.

Referring to FIG. 3 in addition to FIG. 1, the main, the first, and the second limiting circuits 21-0, 21-1, and 21-2 are for limiting the main, the first, and the second gain values in accordance with main, first, and second limiting values, respectively, on producing the main, the first, and the second controllable tap gains. The main, the first, and the second limiting values are positive values, respectively, and may be different from each other.

The first limiting circuit 21-1 comprises a first limiting value generator 26, an absolute calculator 27, a judging circuit 28, a comparator 29, an inverting circuit 30, and first and second selecting circuits 31 and 32. In the illustrated example, each of the main and the second limiting circuits 21-0 and 21-2 comprises similar parts which are illustrated in FIG. 3.

Supplied with the first gain value, the absolute calculator 27 calculates the absolute value of the first gain value to deliver a first absolute value to the comparator 29. The judging circuit 28 judges whether or not the first gain value has a negative value. The judging circuit 28 produces a first positive signal when the first gain value does not have the negative value. When the first gain value has the negative value, the judging circuit 28 produces a first negative signal. The first limiting value generator 26 generates the first limiting value. Supplied with the first absolute value and the first limiting value, the comparator 29 compares the first absolute value with the first limiting value. The comparator 29 produces a first judge result signal to supply a first judge result signal to the second selecting circuit 32 when the first absolute value is smaller than the first limiting value. When the first absolute value is not smaller than the first limiting value, the comparator 29 produces a first detection signal to supply the first detection signal to the second selecting circuit 32.

The inverting circuit 30 inverts the polarity of the first limiting value to produce a first inverted limiting value, i.e. a negative limiting value. The first inverted limiting value is delivered to the first selecting circuit 31. The first selecting circuit 31 receives the first inverted limiting value together with the first limiting value. Responsive to the first positive signal, the first selecting circuit 31 selects the first limiting value from the first inverted limiting value and the first limiting value to supply the first limiting value to the second selecting circuit 32 as a first selected value. Responsive to the first negative signal, the first selecting circuit 31 selects the first inverted limiting value from the first inverted limiting value and the first limiting value to supply the first inverted limiting value to the second selecting circuit 32 as the first selected value. The second selecting circuit 32 receives the first selected value together with the first gain value. Responsive to the first judge result signal, the second selecting circuit 32 selects the first gain value from the first selected value and the first gain value to supply the first gain value to the transversal filter 15 as the first controllable tap gain. Responsive to first detection signal, the second selecting circuit 32 selects the first selected value from the first selected value and the first gain value to supply the first selected value to the transversal filter 15 as the first controllable tap gain. Similarly, the main and the second limiting circuits 21-0 and 21-2 process the main and the second gain values into the main and the second controllable tap gains in accordance with the main and the second limiting values, respectively.

In the conventional adaptive equalizer, the main limiting value is equal to a predetermined value which is, for example, equal to 1. Each of the first and the second limiting values is equal to a prescribed value which is not greater than the predetermined value and may be, for example, equal to $\frac{1}{2}$. When the main limiting value is equal to 1 and each of the first and the second limiting values is equal to $\frac{1}{2}$, it is possible to rapidly control the main controllable tap gain and the first and the second controllable tap gains. However, fading remains as a remaining fading in the equalized signal in the conventional adaptive equalizer. Namely, it is difficult to effectively remove the remaining fading in the equalized signal.

The conventional adaptive equalizer takes a long time to control the main and the first through the N-th controllable tap gains into optimum tap gains, respectively, when the main and the first through the N-th controllable tap gains are greatly apart from the optimum tap gains, namely, when a remaining distortion is left in the equalized signal. It often becomes impossible to control the main and the first through the N-th controllable tap gains into optimum tap gains, respectively, when the demodulator section is not in the carrier synchronization state.

It is necessary to render the main and the first through the N-th controllable tap gains into great values, respectively, in order to remove a serious fading from the equalized signal when the serious fading occurs in the radio channel. In the conventional adaptive equalizer, absolute values of the main and the first through the N-th controllable tap gains are restricted within limiting values, respectively. As a result, the absolute values of the main and the first through the N-th controllable tap gains must become over the limiting values in order to remove the fading when the fading becomes great. However, the absolute values of the main and the first through the N-th controllable tap gains are restricted within limiting values, respectively.

Figure 4:
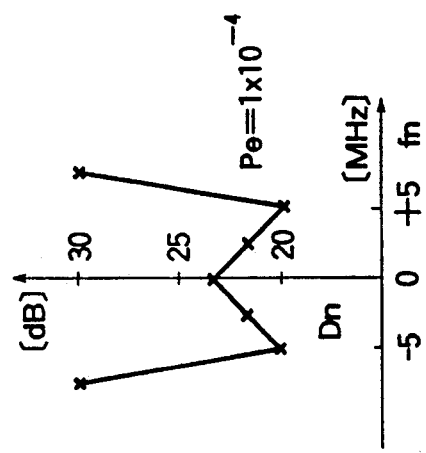
FIG. 4 is a signature curve of a receiver which comprises the adaptive equalizer illustrated in FIG. 1.

FIG. 4 shows a signature curve as called in the art. In order to describe the signature curve a little more in detail, attention will be directed to the fact that the conventional adaptive equalizer 11 is used in a receiver comprising the demodulator section 14. The signature curve is had by the receiver and is for use in estimating an efficiency of the receiver in connection with the fading. In FIG. 4, the signature curve represents depths (Dn) of notches in dB as regards notch frequencies (fn) in MHz of the fading when the equalized signal has an error rate (Pe) of $1 \times 10^{-4}$.

Figure 5:
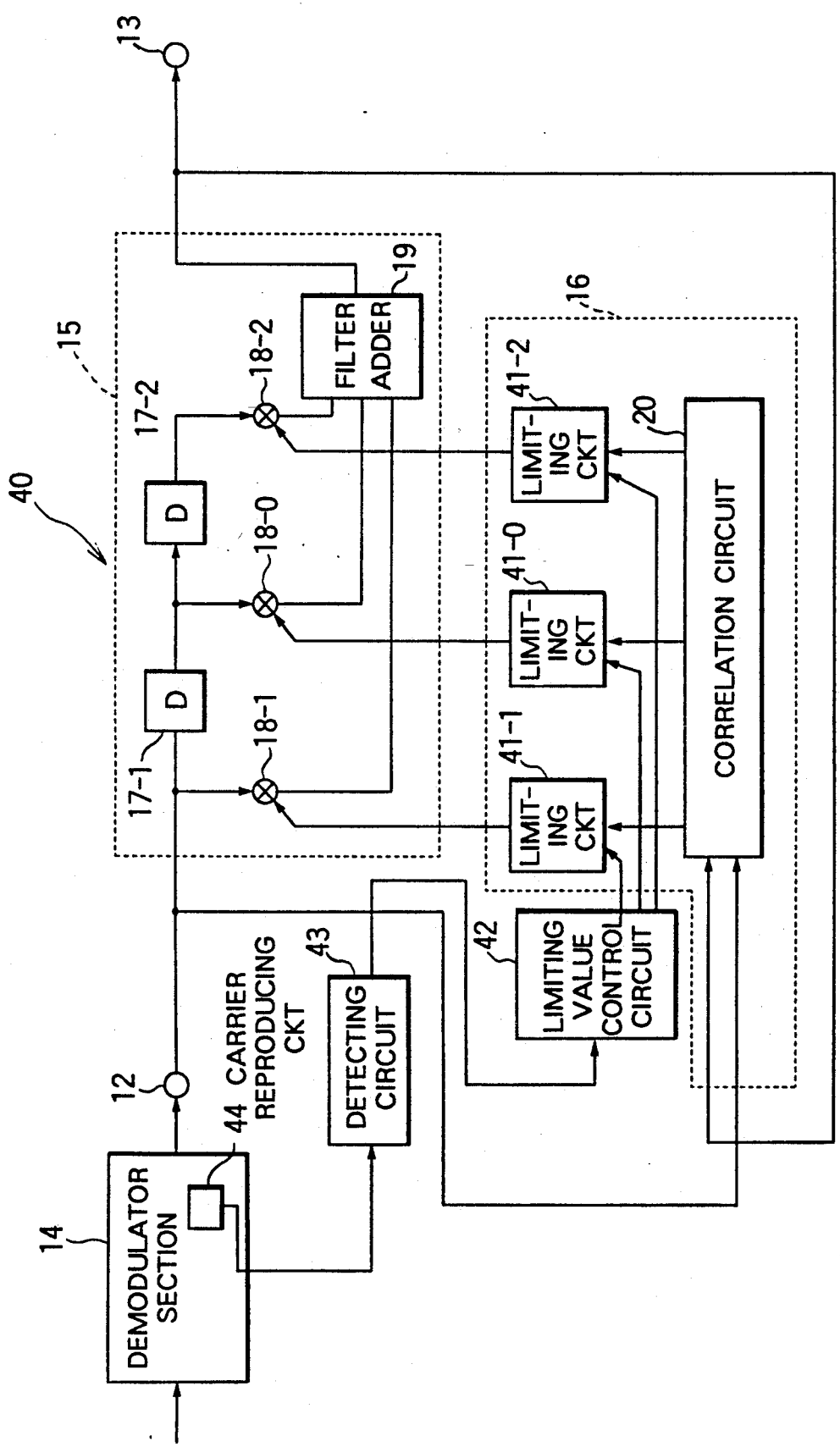
FIG. 5 is a block diagram of an adaptive equalizer according to an embodiment of this invention.

Referring to FIG. 5, the description will proceed to an adaptive equalizer according to a preferred embodiment of this invention. The illustrated adaptive equalizer is different in structure from the adaptive equalizer 11 illustrated with reference to FIG. 1 and is therefore designated afresh by a reference numeral 40. The adaptive equalizer 40 comprises similar parts which are designated by like reference numerals and are operable with likewise named signals. The adaptive equalizer 40 comprises main, first, and second limiting circuits which are different from the main, the first, and the second limiting circuits 21-0, 21-1, and 21-2 illustrated in FIG. 1 and which are therefore designated by different reference numerals 41-0, 41-1, and 41-2, respectively. The adaptive equalizer 40 further comprises a limiting value control circuit 42 and a detecting circuit 43.

The demodulator section 14 comprises a carrier reproducing circuit 44 for reproducing the carrier signal in synchronism with the received signal. When the carrier signal is reproduced from the received signal, the carrier reproducing circuit 44 produces a first control signal to supply the first control signal to the detecting circuit 43. When the carrier signal is not synchronized with the received signal, the carrier reproducing circuit 44 supplies a second control signal to the detecting circuit 43. The detecting circuit 43 discloses in Japanese Unexamined Patent Publication No. 17661/1973 (Tokkai Syo 48-17661).

When supplied with the first control signal, the detecting circuit 43 knows that the demodulator section 14 is put in a carrier synchronization state. The detecting circuit 43 delivers a synchronization signal to the limiting value control circuit 42. When supplied with the second control signal, the detecting circuit 43 knows that the demodulator section 14 is not in the carrier synchronization state. The detecting circuit 43 delivers a non-synchronization signal to the limiting value control circuit 42.

Figure 6:
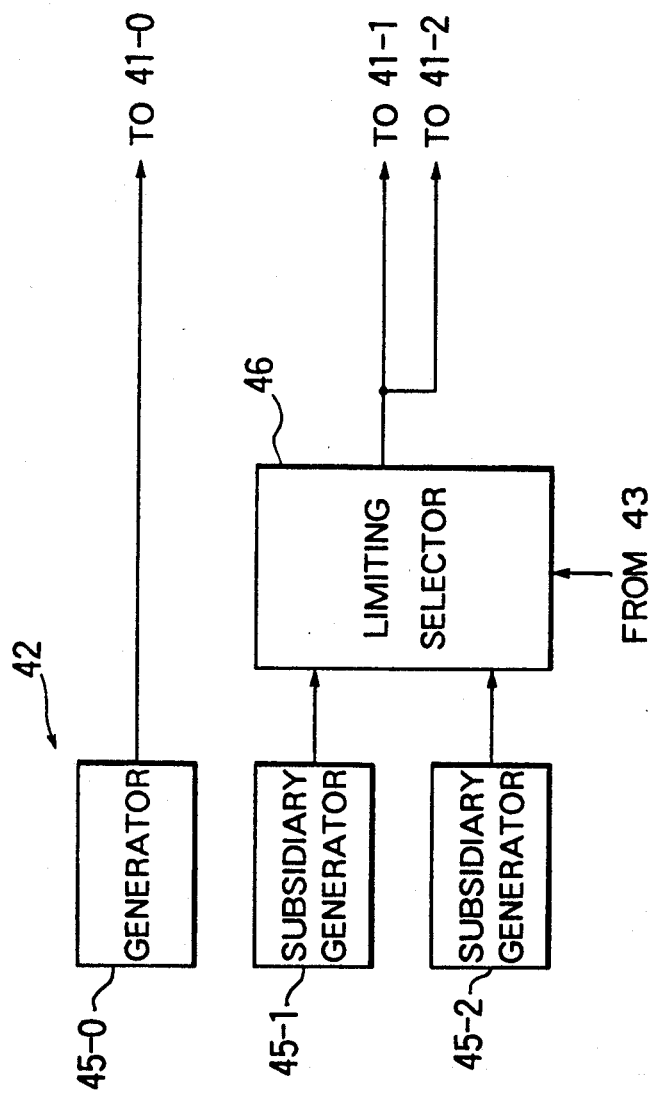
FIG. 6 is a block diagram of a limiting value controlling circuit used in the adaptive equalizer illustrated in FIG. 5.

Referring to FIG. 6 together with FIG. 5, the limiting value control circuit 42 comprises a main generator 45-0 and first and second subsidiary generators 45-1 and 45-2. The main generator 45-0 and the first and the second subsidiary generators 45-1 and 45-2 generate a main value signal and first and second subsidiary value signals, respectively. In the illustrated example, the main value signal is representative of 1. The first and the second subsidiary value signals are representative of 1 and $\frac{1}{2}$, respectively. The main value signal is supplied to the main limiting circuit 41-0 as a main parameter. The first and the second subsidiary value signals are delivered to a limiting selector 46 which is selectively given the synchronization and the non-synchronization signals. When supplied with the synchronization signal, the limiting selector 46 selects the first subsidiary value signal from the first and the second subsidiary value signals to supply the first subsidiary value signal to the first and the second limiting circuits 41-1 and 41-2 as first and second parameters, respectively. When supplied with the non-synchronization signal, the limiting selector 46 selects the second subsidiary value signal from the first and the second subsidiary value signals to supply the second subsidiary value signal to the first and the second limiting circuits 41-1 and 41-2 as first and second parameters, respectively.

In FIG. 5, the first limiting circuit 41-1 is similar in structure to that described in conjunction with FIG. 3 except that the first limiting value generator 26 is omitted from FIG. 5. The first subsidiary value signal is supplied from the limiting value control circuit 42 to the first limiting circuit 41-1 as the first parameter when the demodulator section 14 is put in the carrier synchronization state. Similarly, the second subsidiary value signal is supplied from the limiting value control circuit 42 to the first limiting circuit 41-1 as the first parameter when the demodulator section 14 is not in the carrier synchronization state. Therefore, the first limiting circuit 41-1 processes the first gain value into the first controllable tap gain in accordance with the first parameter.

Each of the main and the second limiting circuits 41-0 and 41-2 comprises parts which are similar to those of the first limiting circuit 41-1 The main value signal is supplied from the limiting value control circuit 42 to the main limiting circuit 41-0 as the main parameter whether or not the demodulator section 14 is in the carrier synchronization state. The main limiting circuit 41-0 processes the main gain value into the main controllable tap gain in accordance with the main parameter.

The first subsidiary value signal is supplied from the limiting value control circuit 42 to the second limiting circuit 41-2 as the second parameter when the demodulator section 14 is in the carrier synchronization state. Similarly, the second subsidiary value signal is supplied from the limiting value control circuit 42 to the second limiting circuit 41-2 as the second parameter when the demodulator section 14 is not in the carrier synchronization state. Therefore, the second limiting circuit 41-2 processes the second gain value into the second controllable tap gain in accordance with the second parameter.

Figure 7:
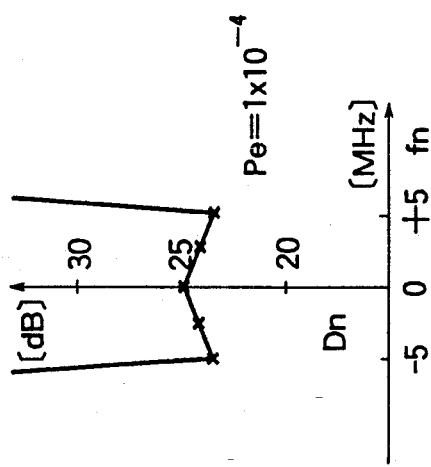
FIG. 7 is a signature curve of a receiver which comprises the adaptive equalizer illustrated in FIG. 5.

Referring to FIG. 7, a signature curve is similar to that shown in FIG. 4 and shows a characteristic of a receiver comprising the adaptive equalizer 40 illustrated in FIG. 5. In FIG. 7, the depth (Dn) of the notch is equal to about 25 dB when the notch frequency (fn) is equal to 0 MHz. The depth (Dn) of the notch is equal to about 24 dB when the notch frequencies (fn) are equal to +5 MHz and −5 MHz. For reference, the depth (Dn) of the notch is equal to about 23 dB when the notch frequency (fn) is equal to 0 MHz in FIG. 4. The depth (Dn) of the notch is equal to about 20 dB when the notch frequencies (fn) are equal to +5 MHz and −5 MHz in FIG. 4. by comparing FIGS. 4 and 7, it is readily understood that the adaptive equalizer according to this embodiment is superior in characteristic to the conventional adaptive equalizer illustrated in FIG. 1.

In the adaptive equalizer illustrated in FIG. 5, it often becomes difficult to control the main, the first, the second controllable tap gains in case where the first and the second parameters rapidly turn ½ to 1 when the demodulator section 14 rapidly turn the carrier synchronization state to non carrier synchronization state.

Figure 8:
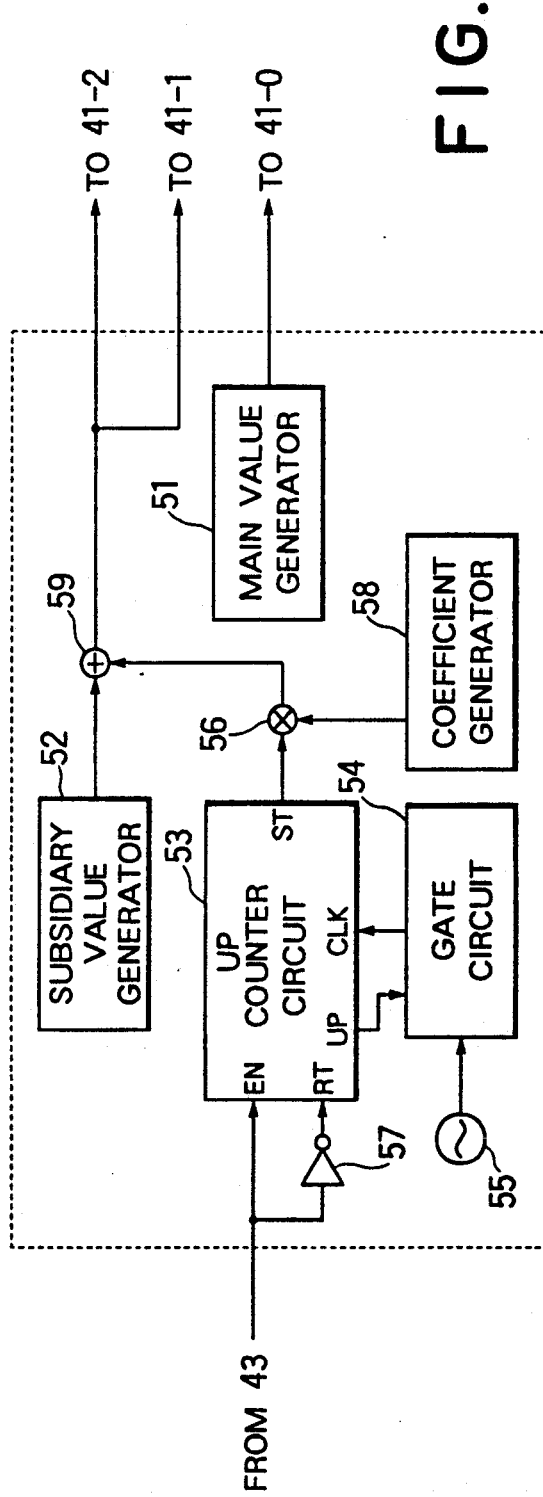
FIG. 8 is a block diagram of another limiting value controlling circuit used in the adaptive equalizer illustrated in FIG. 5.

Referring to FIG. 8 in addition to FIG. 5, description will be made as regards another example of a limiting value control circuit. The illustrated limiting value control circuit is different in structure from the limiting value control circuit 42 illustrated in FIG. 6 and is therefore designated afresh by a reference numeral 50. The limiting value control circuit 50 comprises a main value generator 51 and a subsidiary value generator 52. Supplied with any one of the synchronization and the non-synchronization signals, the main value and the subsidiary value generators 51 and 52 generate main and subsidiary value signals which are representative of main and subsidiary values, respectively. The main and the subsidiary values are equal, for example, to 1 and ½, respectively.

The limiting value control circuit 50 further comprises an up counter circuit 53 connected to the detecting circuit 43. The up counter circuit 53 has an enable terminal labelled "EN", a reset terminal labelled "RT", a clock input terminal labelled "CLK", a count up terminal labelled "UP", and a signal output terminal labelled "ST". The up counter circuit 53 is connected to a gate circuit 54 through the clock input terminal CLK and the count up terminal UP. The gate circuit 54 is further connected in turn to a clock oscillator 55. The gate circuit 54 is operable to selectively supply clock pulses from the clock oscillator 55 to the up counter circuit 53. The gate circuit 54 stops supplying the clock pulses to the up counter circuit 53 in response to a carry signal which will presently be described.

As described above in conjunction with FIG. 5, the detecting circuit 43 supplies the synchronization signal to the limiting value control circuit 50 when the demodulator section 14 is put in the carrier synchronization state. When the demodulator section 14 is not in the carrier synchronization state, the detecting circuit 43 supplies the non-synchronization signal to the limiting value control circuit 50. The synchronization and the non-synchronization signals may high and low level signals, respectively.

Referring to FIG. 8 alone, the up counter circuit 53 has an initial count which may be equal to zero. When supplied with the synchronization signal from the enable terminal EN, the up counter circuit 53 counts up the clock pulses to produce a count. From the signal output terminal ST, the up counter circuit 53 supplies a limiting multiplier 56 with a count signal which is representative of the count. When the count reaches a predetermined number M such as $2^{10}$, the up counter circuit 53 supplies the carry signal to the gate circuit 54 through the count up terminal UP. Responsive to the carry signal, the gate circuit 54 stops supplying the clock pulses to the counter circuit 53. The up counter circuit 53 continues supplying the limiting multiplier 56 with the count signal which is representative of the predetermined number M.

Supplied with the non-synchronization signal from the detecting circuit 43, an inverter gate 57 inverts the synchronization signal into an inverted signal to supply the inverted signal to the up counter circuit 53. When supplied with the inverted signal at the reset terminal RT, the up counter circuit 53 is reset into the initial count and stops supplying the carry signal to the gate circuit 54. As a result, the gate circuit 55 serves to selectively supply the clock pulses to the counter circuit 53.

As described above, the count signal is supplied to the limiting multiplier 56. The limiting multiplier 56 is connected to a coefficient generator 58 for generating a coefficient signal representative of a predetermined coefficient K. The predetermined coefficient K is given by:

$$K=(P-Q)/M, \qquad (1)$$

where P represents the main value and Q represents the subsidiary value.

The limiting multiplier 56 multiplies the count signal by the coefficient signal to supply a limiting multiplied signal to a limiting adder 59. The limiting multiplied signal is supplied together with the subsidiary value signal to the limiting adder 59. The limiting adder 59 adds the subsidiary value signal to the limiting multiplied signal to produce a sum signal. The limiting adder 59 supplies the sum signal to the first and the second limiting circuits 41-1 and 41-2 (FIG. 5) as the first and the second parameters, respectively. The main value signal is supplied from the main value generator 51 to the main limiting circuit 41-0 (FIG. 5) as the main parameter.

In conjunction with FIG. 8, it is readily understood that the up counter circuit 53, the limiting multiplier 56, the coefficient generator 58, and the limiting adder 59 are collectively operable as a sending circuit.

Figure 9:
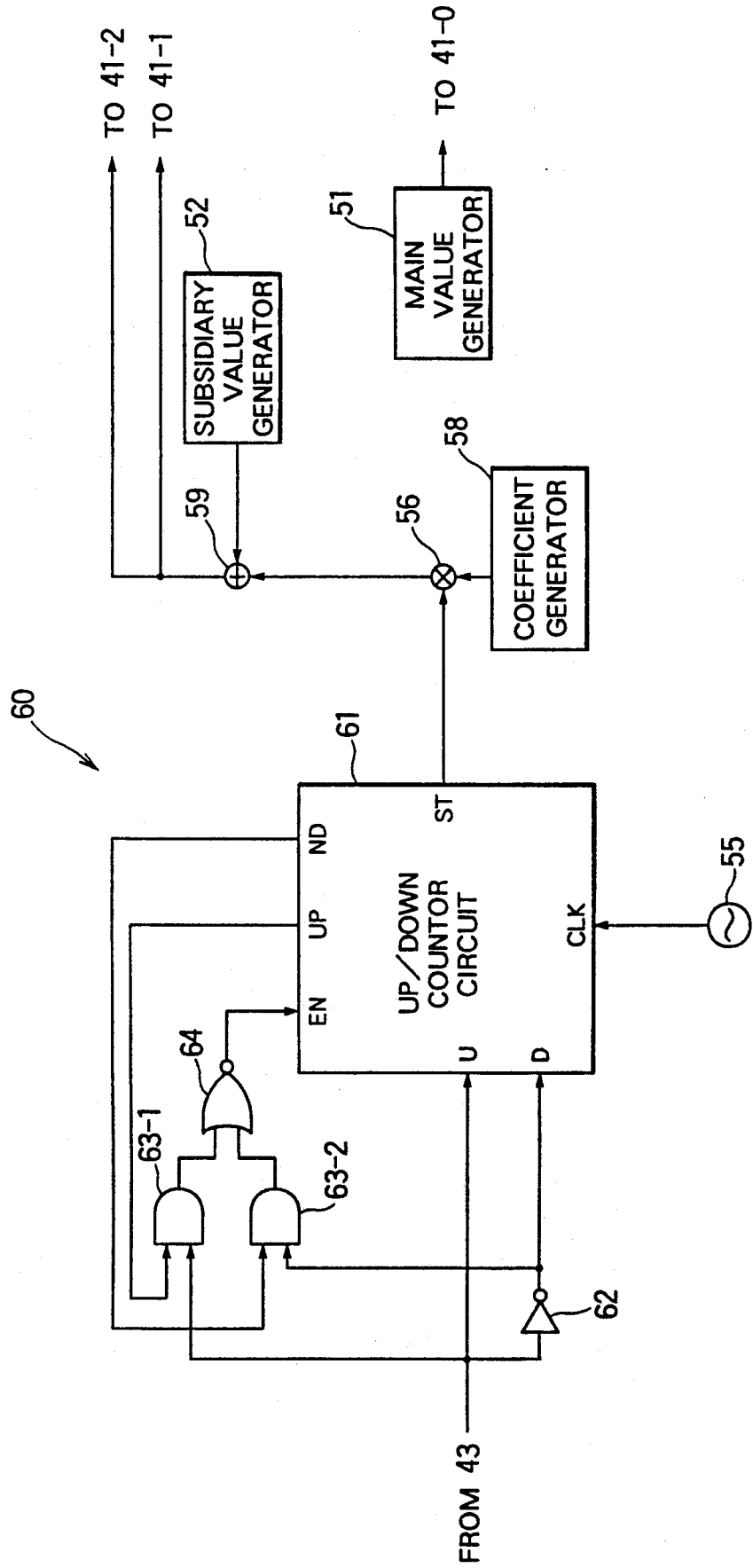
FIG. 9 is a block diagram of still another controlling circuit used in the adaptive equalizer illustrated in FIG. 5.

Referring to FIG. 9 in addition to FIG. 5, description will proceed to a still another example of a limiting value control circuit. The illustrated limiting value control circuit is different from the limiting value control circuit 50 illustrated in FIG. 8 and is therefore designated afresh by a reference numeral 60. The limiting value control circuit 60 comprises similar parts which are designated by like reference numerals and are operable by likewise named signals. The limiting value control circuit 60 comprises an up/down counter circuit 61 having an initial count which may be equal to zero. The up/down counter circuit 61 has an enable terminal labelled "EN", a first signal input terminal labelled "U", a second signal input terminal labelled "D", a clock input terminal labelled "CLK", a count up terminal labelled "UP", a count down terminal labelled "DN", and a signal output terminal labelled "ST".

The up/down counter circuit 61 is directly connected to the clock oscillator 55 at the clock input terminal CLK. The clock oscillator 55 supplies clock pulses to the up/down counter circuit 61. The up/down counter circuit 61 is selectively operable as up and down counters. When the up/down counter circuit 61 is operable as the up counter, the up/down counter circuit 61 counts up the clock pulses to produce a first count signal representative of a first count. When the first count reaches the predetermined count number M, the up/down counter circuit 61 produces a carry signal from the count up terminal UP. The carry signal has a high level. When the up/down counter circuit is operable as the down counter, the up/down counter circuit 61 counts down the clock pulses to produce a second count signal representative of a second count. When the second count reaches the initial count, the up/down counter circuit 61 produces a borrow signal from the count down terminal DN. The borrow signal has a high level.

When the demodulator section 14 is put in the carrier synchronization state, the detecting circuit 43 supplies the limiting value control circuit 60 with the synchronization signal which is the high level signal. When supplied with the synchronization signal at the first signal input terminal U, the up/down counter circuit 61 is operable as the up counter. The synchronization signal is further supplied to a primary inverter gate 62 and a first AND gate 63-1. The primary inverter gate 62 inverts the synchronization signal into a first inverted signal of a low level to supply the first inverted signal to a second AND gate 63-2. When the up/down counter circuit 61 produces neither the carry signal or the borrow signal, the first and the second AND gates 63-1 and 63-2 supply a NOR gate 64 with first and second AND'ed signals, each representative of the low level. The NOR gate 64 supplies the enable terminal EN of the up/down counter circuit 61 with a first NOR'ed signal having a high level. When supplied with the first NOR'ed signal, the up/down counter circuit 61 counts up the clock pulses to supply the limiting multiplier 56 with the first count signal.

In the similar manner described in conjunction with FIG. 8, the limiting multiplier 56 multiplies the first count signal by the coefficient signal to supply a first limiting multiplied signal to the limiting adder 59. The limiting adder 59 adds the first limiting multiplied signal to the subsidiary value signal to produce a first sum signal. The limiting adder 59 supplies the first sum signal to the first and the second limiting circuits 41-1 and 41-2 as the first and the second parameters, respectively.

As described above, the up/down counter circuit 61 produces the carry signal when the first count signal is representative of the predetermined number M. As a result, the first AND gate 63-1 supplies the NOR gate 64 with a third AND'ed signal having a high level. Inasmuch as the second AND gate 63-2 supplies the second AND'ed signal to the NOR gate 64, the NOR gate 64 supplies the enable terminal EN of the up/down counter circuit 61 with a second NOR'ed signal having a low level. When supplied with the second NOR'ed signal through the enable terminal EN, the up/down counter circuit 61 stops the count up operation and continues supplying the limiting multiplier 56 with the first count signal having the predetermined number M.

When the demodulator section 14 is put out of the carrier synchronization state, the detecting circuit 43 supplies the limiting value control circuit 60 with the non-synchronization signal which is the low level signal. The non-synchronization signal is supplied to the primary inverter gate 62 and the first AND gate 63-1. The primary inverter gate 62 inverts the non-synchronization signal into a second inverted signal having a high level. The primary inverter gate 62 supplies the second inverted signal to the second AND gate 63-2 and the second signal input terminal D. When supplied with the second inverted signal through the second signal input terminal D, the up/down counter circuit 61 is operable as the down counter.

When supplied with the non-synchronization signal, the first AND gate 63-1 supplies the first AND'ed signal to the NOR gate 64. Inasmuch as the up/down counter circuit 61 does not produce the borrow signal, the second AND gate 63-2 supplies the second AND'ed signal to the NOR gate 64. The NOR gate 64 supplies the first NOR'ed signal to the enable terminal EN of the up/down counter circuit 61. When supplied with the first NOR'ed signal, the up/down counter circuit 61 counts down the clock pulses to supply the limiting multiplier 56 with the second count signal.

In the manner described in conjunction with FIG. 8, the limiting multiplier 56 multiplies the second count signal by the coefficient signal to supply a second limiting multiplied signal to the limiting adder 59. The limiting adder 59 adds the limiting multiplied signal to the subsidiary value signal to produce a second sum signal. The limiting adder 59 supplies the second sum signal to the first and the second limiting circuits 41-1 and 41-2 as the first and the second parameters, respectively.

As described above, the up/down counter circuit 61 produces the borrow signal having a high level when the second count signal represents the initial count. As a result, the second AND gate 63-2 supplies the NOR gate 64 with a fourth AND'ed signal having a high level. The NOR gate 64 supplies the second NOR'ed signal to the enable terminal EN of the up/down counter circuit 61. Responsive to the second NOR'ed signal, the up/down counter circuit 61 stops the count down operation and continues supplying the limiting multiplier 56 with the second count signal having the initial count.

In conjunction with FIG. 9, it is readily understood that the up/down counter 61, the limiting multiplier 56, the coefficient generator 58, and the limiting adder 59 collectively serve as a sending circuit.

As described above in conjunction with FIGS. 8 and 9, it is possible to sufficiently control the main, the first, and the second controllable tap gains because the first and the second parameters gradually increase from the subsidiary value to the main value.

What is claimed is:

1. An adaptive equalizer connected to a demodulator section for demodulating a received signal into a demodulated signal, said adaptive equalizer comprising an equalizer section for equalizing said demodulated signal into an equalized signal in accordance with a main controllable tap gain and first through N-th controllable tap gains, where N represents a positive integer which is not less than one, a producing section for producing a main gain value and first through N-th gain values dependent upon said demodulated signal and said equalized signal, and a limiting section for limiting said main gain value and said first through said N-th gain values in accordance with a main parameter and first through N-th parameters, respectively, to produce said main controllable tap gain and said first through said N-th controllable tap gains, said adaptive equalizer further comprising:

detecting means for detecting whether or not said demodulator section is in a synchronization state to produce a first detecting signal when said demodulator section is in said synchronization state, said detecting means producing a second detecting signal when said demodulator section is out of said synchronization state;

first supplying means responsive to any one of said first and said second detecting signals for supplying a main value as said main parameter to said limiting section; and second supplying means responsive to said first detecting signal for supplying first through N-th values as said first through said N-th parameters to said limiting section, said second supplying means being responsive to said second detecting signal for supplying first through N-th additional values as said first through said N-th parameters to said limiting section.

2. An adaptive equalizer as claimed in claim 1, wherein said first through said N-th additional values are not greater than said first through said N-th values.

3. An adaptive equalizer as claimed in claim 2, said first through said N-th values being a common predetermined value, said first through said N-th additional values being a common prescribed value, wherein:
   said second supplying means comprises: generating means for generating said common prescribed value; and
   sending means responsive to said second detecting signal for sending said common prescribed value as said first through said N-th parameters to said limiting section, said sending means being responsive to said first detecting signal for incrementing said common prescribed value into an incremented value in accordance with a preselected value until said incremented value reaches said common predetermined value, said incrementing means supplying said incremented value as said first through said N-th parameters to said limiting section.

4. An adaptive equalizer as claimed in claim 2, said first through said N-th values being a common predetermined value, said first through said N-th additional values being a common prescribed value, wherein:
   said second supplying means comprises:
   generating means for generating said common prescribed value; and
   sending means for sending said common prescribed value as said first through said N-th parameters to said limiting section in response to said second detecting signal when an incremented value is equal to said common prescribed value, said sending means being responsive to said first detecting signal for incrementing said common prescribed value into an incremented value in accordance with a preselected value until said incremented value reaches said common predetermined value, said incrementing means supplying said incremented value as said first through said N-th parameters to said limiting section, said sending means decrementing said incremented value into a decremented value in accordance with said preselected value until said decremented value reaches said common prescribed value, said sending means supplying said decremented value as said first through said N-th parameters to said limiting section in response to said second detecting signal when said incremented value is not equal to said common prescribed value.

5. An adaptive equalizer as claimed in claim 1, each of said main and said first through said N-th parameters having a positive value, wherein said processing section comprises:
   judging means for processing said main and said first through said N-th gain values by judging whether or not said main and said first through said N-th gain values have absolute values which are smaller than said main and said first through said N-th parameters, respectively, said first judging means producing main and first through N-th judge result signals when the absolute values of said main and said first through said N-th gain values are smaller than said main and said first through said N-th parameters, respectively, said first judging means producing main and first through N-th detection signals when the absolute values of said main and said first through said N-th gain values are not smaller than said main and said first through said N-th parameters, respectively;
   second judging means for processing said main and said first through said N-th gain values by judging whether or not said main and said first through said N-th gain values have negative values, said second judging means producing main and first through N-th negative signals when said main and said first through said N-th gain values have said negative values, said second judging means producing main and first through N-th positive signals when said main and said first through said N-th gain values do not have said negative values;
   inverting means for inverting said main and said first through said N-th parameters into main and first through N-th inverted parameters, respectively;
   path means connected to said second judging means for allowing said main and said first through said N-th inverted parameters to pass therethrough as main and first through N-th parameter values when supplied with said main and said first through said N-th negative signals, respectively, said path means allowing said main and said first through said N-th parameters to pass therethrough as said main and said first through said N-th parameter values when supplied with said main and said first through said N-th positive signals, respectively; and delivering means connected to said first judging means for delivering said main and said first through said N-th gain values to said equalizer section as said main and said first through said N-th controllable tap gains, respectively, when supplied with said main and said first through said N-th judge result signals, said delivering means delivering said main and said first through said N-th parameter values to said equalizer section as said main and said first through said N-th controllable tap gains, respectively, when supplied with said main and first through N-th detection signals.

* * * * *